United States Patent
Rockley

(10) Patent No.: US 8,319,880 B2
(45) Date of Patent: Nov. 27, 2012

(54) DUAL BEAM OPTIC WITH DICHROIC FILTER

(75) Inventor: Mark G. Rockley, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 692 days.

(21) Appl. No.: 12/372,888

(22) Filed: Feb. 18, 2009

(65) Prior Publication Data

US 2011/0176048 A1    Jul. 21, 2011

Related U.S. Application Data

(60) Provisional application No. 61/029,521, filed on Feb. 18, 2008.

(51) Int. Cl.
H04N 5/225 (2006.01)
(52) U.S. Cl. .................................................. 348/340
(58) Field of Classification Search ............ 348/340
See application file for complete search history.

(56) References Cited

U.S. PATENT DOCUMENTS

| | | |
|---|---|---|
| 4,734,756 A | 3/1988 | Butterfield et al. |
| 5,708,504 A | 1/1998 | Hopkins |
| 5,739,955 A | 4/1998 | Marshall |
| 5,841,574 A | 11/1998 | Willey |
| 5,880,771 A | 3/1999 | Sutton |
| 5,900,942 A * | 5/1999 | Spiering ................. 356/400 |
| 5,912,451 A | 6/1999 | Gurevich et al. |
| 5,926,283 A * | 7/1999 | Hopkins .................. 356/419 |
| 5,969,323 A | 10/1999 | Gurevich et al. |
| 5,982,497 A | 11/1999 | Hopkins |
| 6,211,955 B1 * | 4/2001 | Basiji et al. ............. 356/326 |
| 6,441,973 B1 | 8/2002 | Ramm et al. |
| 6,473,176 B2 * | 10/2002 | Basiji et al. ............. 356/326 |
| 7,298,484 B2 | 11/2007 | Chen et al. |
| 2002/0063853 A1 * | 5/2002 | Maki et al. ................ 353/53 |
| 2002/0122192 A1 | 9/2002 | Ott |
| 2002/0176054 A1 | 11/2002 | Mihalakis |
| 2003/0153825 A1 * | 8/2003 | Mooradian et al. ......... 600/407 |
| 2007/0263226 A1 * | 11/2007 | Kurtz et al. ............... 356/492 |

* cited by examiner

*Primary Examiner* — James Hannett
(74) *Attorney, Agent, or Firm* — Fellers, Snider, Blankenship, Bailey & Tippens, P.C.

(57) ABSTRACT

An apparatus and method for generating co-registerable images for processing is disclosed. The apparatus includes a dichroic filter that splits an electro-magnetic beam into first and second split beams, and a mirror that reflects the second split beam. The dichroic filter and the first and second split beams are arranged to direct the first and second split beams, respectively, along substantially parallel but non overlapping paths.

11 Claims, 2 Drawing Sheets

DUAL BEAM OPTIC WITH DICHROIC FILTER

CROSS REFERENCE TO RELATED APPLICATIONS

This application claims priority to U.S. Provisional Patent Application No. 61/029,521, entitled "DUAL BEAM OPTIC WITH DICHROIC FILTER," filed Feb. 18, 2008, the contents of which are hereby incorporated by reference.

FIELD OF THE INVENTION

This disclosure relates to optical systems in general and, more specifically, to an optical system and method for producing co-registerable images.

BACKGROUND OF THE INVENTION

Detection of certain analyte gases and other phenomena may be determined by spectral analysis in the ultra-violet, visible, mid wavelength infrared red, and other spectral regions. Imaging cameras may be used in these applications to detect analyte gases or other phenomena. Anomalies may be determined by mathematical subtraction of one image from the other. Failures in the co-registration of a captured image can result in an anomaly associated with the spatial referencing background. This may appear equivalent in spectral signature to the target analyte or phenomena.

For these and other reasons, previous stereoscopic imaging systems will not suffice for these multi-spectral analysis operations. This is owing in part to the fact that, by design, these prior systems present a pair of images to the detector focal plane array which contain a substantial amount of parallax generated differentiation (from which the stereoscopic perspective is inferred).

What is needed is a system and method for addressing these and other issues.

SUMMARY OF THE INVENTION

The present invention disclosed and claimed herein, in one aspect thereof, comprises an apparatus for generating co-registerable images for processing. The apparatus includes a dichroic filter that splits an electromagnetic beam into first and second split beams, and a mirror that reflects the second split beam. The dichroic filter and the first and second split beams are arranged to direct the first and second split beams, respectively, along substantially parallel but non-overlapping paths. In some embodiments, the mirror may be another dichroic filter that reflects only a portion of the second beam.

The apparatus may also include a lens, such as an objective digital camera lens, that receives the first and second split beams. A focal plane array, such as an optical sensor of a digital camera, may receive the first and second split beams passed through the lens. The first and second split beams may also be optically modified by spectral and/or polarization modifiers before reaching the lens.

The present invention, disclosed and claimed herein, in another aspect thereof, comprises a method comprising including splitting an incoming electromagnetic beam into first and second beams having first and second spectral bands, respectively, and reflecting the first and second beams along substantially parallel, non-overlapping paths. In some embodiments, at least one of the first and second split beams may be optically modified to alter the polarization and/or spectrum. The first and second beams may be passed through an objective lens and received on a focal point array.

In some embodiments, splitting an incoming electromagnetic beam into first and second beams having first and second spectral bands, respectively, further includes passing the incoming electromagnetic beam through a dichroic filter that passes a portion of the incoming beam to a mirror creating the first beam, and reflects a portion of the incoming beam creating the second beam, the dichroic filter and mirror being arranged so as to reflect the first and second beams along the substantially parallel, non-overlapping paths.

DETAILED DESCRIPTION OF THE PREFERRED EMBODIMENTS

Figure 1:
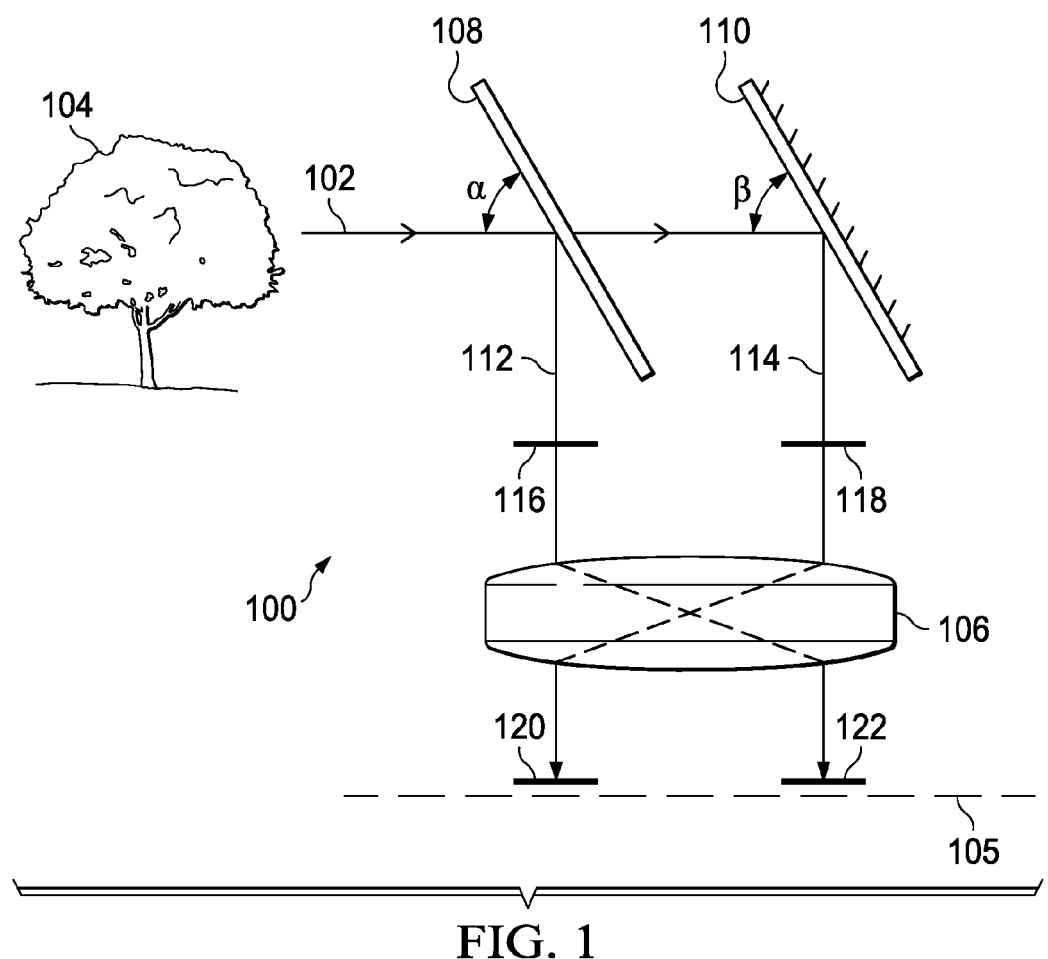
FIG. 1 is a schematic diagram of an apparatus for producing co-registerable images according to aspects of the present disclosure.

Referring now to FIG. 1, a schematic diagram of an apparatus for producing co-registerable images is shown. An imaging sensor system 100 images, in two different spectral bands, a light beam traveling on a light path 102 from a target 104. In one embodiment, the sensor system 100 includes an imaging sensor 105 to image light with a spectral responsivity that encompasses the two transmitted spectral bands, an objective lens 106 of convenient arrangement capable of imaging the object or target 104, and an intervening pair of optical elements comprising one dichroic reflecting element 108 and one fully reflecting element 110.

The system 100 generates two independent beams 112, 114 which may in turn be selectively filtered by additional absorbing filters 116, 118 placed in the beam path between the two plane optical elements 108, 110 and the objective lens 106 in front of the detecting focal plane array 105. It is understood that the objective lens 106 may actually comprise a combination of mirrors and optics, rather than a single objective lens.

The two plane optical elements 108, 110 present two beams 112, 114 to the detecting focal plane array 105 at two different locations 120, 122 on the focal plane array 105, yet each sub-beam 112, 114 contains substantially identical spatial information regarding the object 104. Because the two beams 112, 114 do not overlap on a single optical element, they may be independently modified by intervening optical elements 116, 118 to alter the transmitted polarization or band of wavelengths transmitted in each sub-beam 112, 114. The system 100 may be used to image meat carcasses, fugitive gas emissions, and other surfaces where a single fused image containing two or more wavelengths provides useful analytical information.

In one embodiment, the present disclosure relates to a modification of the fore-optics of an imaging camera system 100 for purposes of multispectral imaging. Multispectral imaging may be used to infer information from a viewed scene due to spectral or related optical parameters that may provide information about the scene. For example, if a scene contains a fugitive gas, as might be obtained from a smoke stack, gas pipeline, or refinery, such gas may have a characteristic spectral absorption in the mid wavelength infrared red (MWIR). When an image of the scene is obtained using wavelengths outside of but spectrally near to, this spectral range absorbed by the analyte gas and is compared with an equivalent image obtained using a band of wavelengths covering primarily those wavelengths absorbed by the analyte gas, a comparison of those two images will reveal information about the fugitive gas.

If the two images obtained as described above are co-registered, the local spatial information related to background clutter will be substantially identical in the two images. This is because the typical field of view is radiating in the MWIR with an intensity dependent on the surface temperature and emissivity of the objects in the field of view and the background temperature. The emission spectrum of such objects in a typical field is, in general, somewhat featureless. Thus, a specific anomaly in the field such as a fugitive gas which has a narrow absorption spectrum against this broad spectral background may be inferred by differential image comparison. While fugitive gases may be inferred this way through MWIR imaging, soil surface disturbance resulting in surface emissivity changes may also be inferred. In addition, differential comparisons in the visible and near UV spectral ranges may also be used to determine local mineral composition, contamination of food surfaces, chemical contamination of surfaces and other anomalies, commonly observed by multi-spectral imaging techniques.

The systems and methods of the present disclosure may be applied to imaging cameras in the UV, visible and MWIR spectral regions. The systems and methods of the present disclosure may present optical data to the detecting focal plane array present in a video and/or single frame camera a pair of images which may be co-registered. The pair of images may be subjected to differing spectral separation methods. One application of such a multi-spectral system involves video rate imaging. Furthermore, the imaging system is typically scanned across the field. Since the anomalies will be typically determined by mathematical subtraction of one image from the other, failures in the co-registration may result in an anomaly associated with the spatial referencing background. This may appear equivalent in spectral signature to the analyte.

For these and other reasons, previous stereoscopic imaging systems will not suffice for these multi-spectral analysis operations. This is owing in part to the fact that, by design, these prior systems present a pair of images to the detector focal plane array which contain a substantial amount of parallax generated differentiation (from which the stereoscopic perspective is inferred). The present disclosure provides an arrangement which permits spectral and optical modification of two sub-beams 112, 114, yet presents both sub-beams to the focal plane array 105 with substantially eliminated parallax error between the two presented images.

The present disclosure provides an optical arrangement which may be placed between the objective lens and the object for any imaging system, thereby producing on the detecting elements of the imaging system a pair of images that are substantially identical.

As used here, a "spectral band" refers to a limited range of wavelengths. In accordance with the present disclosure, an imaging system images in two different spectral bands a light beam traveling on a light path from a target. The imaging system may consist of a focal plane array receiving a transmitted beam from an objective lens arrangement. Preceding the lens arrangement, a preceding fore-optics may be used to generate two sub-beams which are imaged into two different and independent locations at the sensor located at the focal plane of the objective lens.

Referring now to FIG. 1, in operation of the system 100, the primary beam 102 from the subject 104 impinges first on a dichroic filter element 108. This element transmits light in the transmission band which is defined by the nature of the dichroic spectral response at the angle of incidence of the primary beam. In the example displayed, the dichroic element would reflect 95% of the incident light within the spectral band required for sub-beam 112. The remainder of the primary beam 102 is transmitted to reflecting element 110. The first dichroic element 108 and the second reflecting element 110 are separated by a distance in the axis of the incoming primary beam 104 sufficient that the reflected beams 112, 114 from each element 108, 110 arrive at different and non-overlapping regions of the surface of the primary objective lens 106.

Note that in the present system, the second sub-beam 114 is not retransmitted back through the first dichroic element 108. Because the two sub-beams 112, 114 are spatially distinct prior to being transmitted through the objective lens element (s), each may be optically modified with polarizers or absorbing filters 116, 118 for purposes of further enhancing the spectral differences between the two sub-beams 112, 114. The filters 116, 118 may also be combinations of narrow band pass filters, polarizers, or other devices.

Both the dichroic element 108 and the reflecting element 110 are not necessarily at exactly 45 degrees to the axis of the incoming primary beam 102. By slight angular deviation, the individual sub-beams are then directed through the objective lens 106 in a manner that enables spatial separation of the two images on the focal plane array 105.

One result of this arrangement of elements is the avoidance of a preliminary set of optics that might otherwise be required so as to form an intermediate image. The intermediate image would then be re-imaged by intermediate optics so as to form a collimated beam, which is then subsequently divided into separate beams for individual presentation to the imaging sensor.

Thus, the present disclosure provides an optical arrangement that may be appended to an imaging system such that the imaging system may be presented with two nearly co-registerable images which may be optically or spectrally modified, depending on the application.

The dichroic reflector 108 may have a prescribed bandwidth of wavelengths that is reflected with an efficiency ranging from 5% to 95%, and transmits the remaining spectral range of the incident primary beam 102. The second optical element 110 may comprise a reflecting mirror, or a second dichroic reflecting element that reflects the second sub-beam into the common objective element.

The first optical element and second optical element may be deviated from the normal to the primary beam optical axis by an amount sufficient to produce two spatially distinct images on the focal plane of the detecting system. The first and second optical elements may be arranged such that that the second sub-beam reflected from the second optical element is not transmitted through the first optical element.

The imaging sensor 105 may be a single common imaging sensor that images the light of the two different spectral bands. In one embodiment, a preceding arrangement of mirrors or prisms may be used to rotate the primary beam by 90 degrees with respect to the optical axis, thus presenting a pair of vertical images to the sensing focal plane array rather than a pair of horizontal displaced images to the sensing focal plane array.

As described, optical modifiers 116, 118 may be placed between the first and/or the second optical element and the objective lens for purposes of spectral or polarization modification of the respective sub-beams. The optical modifier for each sub beam may be a combination of narrow bandpass filters, polarizers, or other devices.

It can be appreciated that if the two images may be exactly co-registered, then the dual optical paths may be independently modified by optical filters (diffractive, refractive, reflective, or absorptive), thus presenting to the FPA 105 a pair of images which convey the same spatial information but with differing spectral information. This may be useful for dynamic multispectral imaging. Such an imaging sensor may find use in inflight missile recognition, chemical weapons detection, food contamination (such as examination of meat for contamination), fugitive gas emission for refineries and chemical plants, house fumigation measurement, and first responder to chemical spills use.

In some embodiments, the field of view is limited only by the parameters of the collection optic 106. One embodiment will provide a zoomed optical arrangement. Following the first beam splitter 108, the two independent beams of light 112, 114 may each be independently modified by the insertion of absorbing, reflecting, refracting or diffracting elements which in turn may be fixed or dynamically varying in bandwidth and/or transmission band.

Figure 2:
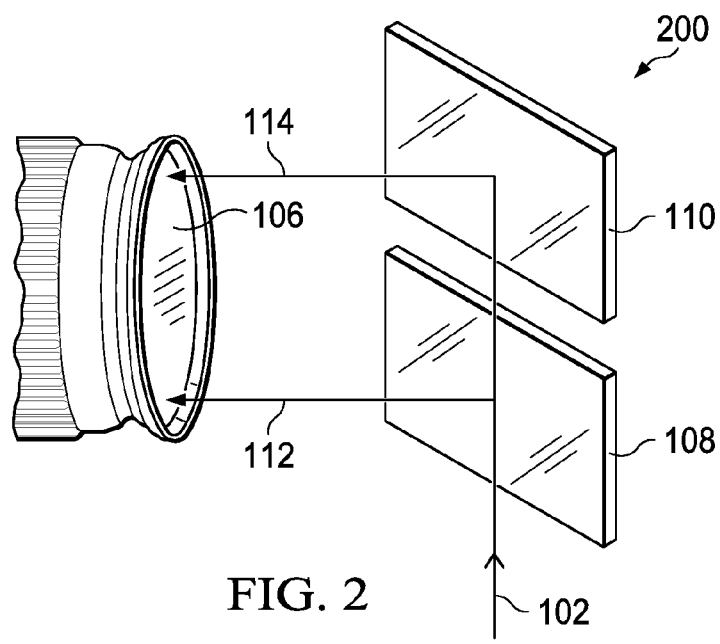
FIG. 2 is a perspective view of a portion of an exemplary implementation of the system of FIG. 1.

Referring now to FIG. 2, a perspective view of a portion of an exemplary implementation of the system of FIG. 1 is shown. In the embodiment shown, the final reflecting element is a front surface aluminized mirror 110, though for certain applications a dichroic reflecting element may provide additional benefits (such as additional wavelength discrimination or optical bandwidth limiting). The dichroic filter 108 is a 1 mm quartz substrate on which is deposited a nominally 50% reflecting dichroic filter, for which the wavelength is centered at 632.8 nm. The objective lens element 106 is a 10× zoom lens built into a Sony 5.0 Megapixel Cyber-Shot® digital camera operating in the visible spectral region. It should be noted that the images may be zoomed with the optical zoom operation of the objective lens without alteration in the overall reduction in parallax errors. Filter 108 and mirror 110 are not exactly at 45 degrees with respect to the optical axis 102. They are displaced by an angle that represents what is necessary to present the incoming bundle of light rays at an angle to the objective lens sufficient to cast the resulting image in the correct position on the final FPA of the camera device itself.

Figure 3:
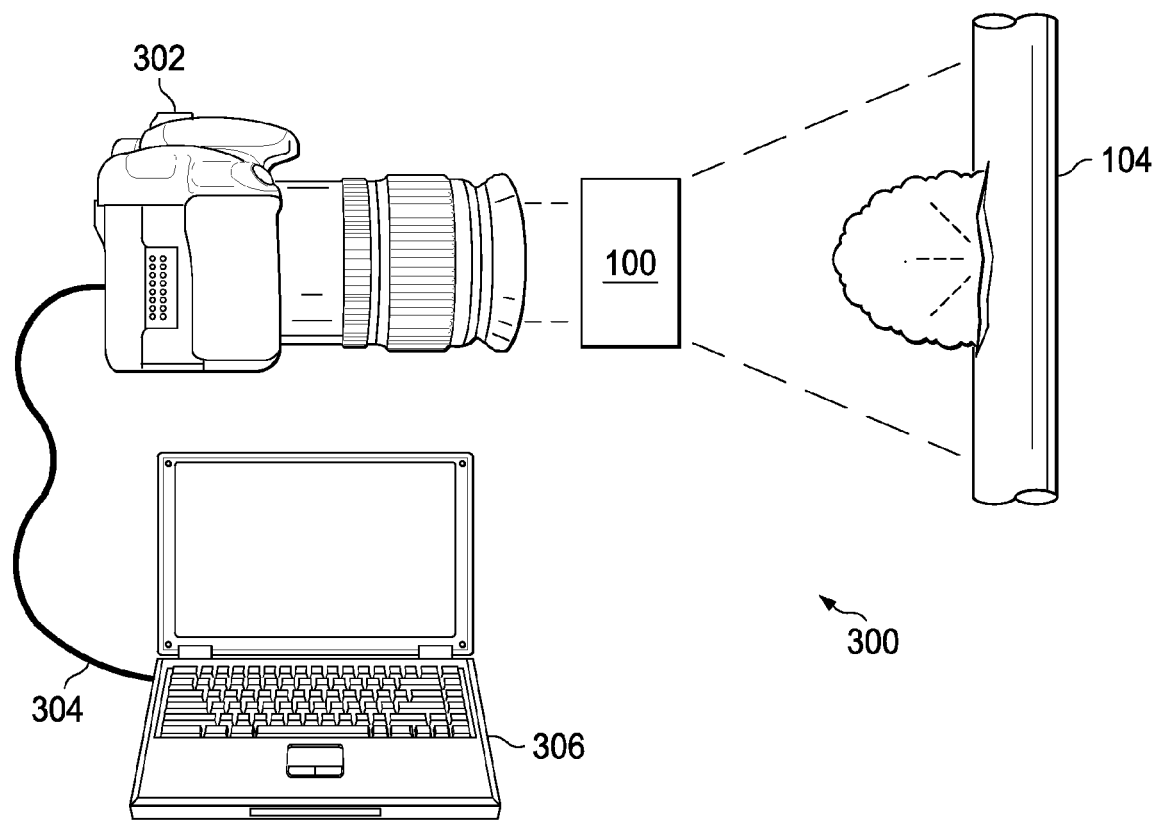
FIG. 3 is a perspective view of one embodiment of a complete system employing the apparatus of FIG. 1.

Referring now to FIG. 3, a perspective view of one embodiment of a complete system employing the apparatus of FIG. 1 is shown. In FIG. 3, the dual beam optic system described with respect to FIGS. 1 and 2 is shown in a packaged form 100. The system 100 of FIG. 3 contains all of the aforedescribed components necessary to produce a parallax free dual beam co-registerable image. The objective element 106 of the previous figures is now subsumed in the camera system 302 of FIG. 3. The target object 104, in this example, is a fugitive gas emission from a fractured pipeline. The requisite parallax free image of the gas emission 104 is produced by the system 100 and passed to the camera system 302, which will also provide the detecting focal plane array previously described. In some embodiments, the camera system 302 will connect via a data link 304 to a computing device 306. In some embodiments, the data link 304 may be a universal serial bus interface (USB), an IEEE 1394 interface, or another suitable communications link. The computing device 306 may be a computer, or a computer program, capable of performing the necessary image and data manipulation on the co-registerable images obtained from the camera system 302 to detect and identify the target 104 and its associated properties of interest.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. An apparatus comprising:
   a dichroic filter that splits an electro-magnetic beam into first and second split beams; and
   a mirror that reflects the second split beam;
   wherein the dichroic filter and the first and second split beams are arranged to direct the first and second split beams, respectively, along substantially parallel but non-overlapping paths to a lens that receives the first and second split beams;
   wherein the first and second beams continue from the lens along non-overlapping paths to a focal plane array receiving first and second images from the first and second beams, respectively; and
   a polarization modifier interposing the dichroic filter and the lens in the first split beam.

2. The apparatus of claim 1, wherein the lens is an objective digital camera lens.

3. The apparatus of claim 1, wherein the focal plane array is an optical sensor of a digital camera.

4. The apparatus of claim 1, wherein the optical modifier further comprises a spectral modifier.

5. The apparatus of claim 1, further comprising an optical modifier interposing the dichroic filter and the lens in the second split beam.

6. The apparatus of claim 5, wherein the optical modifier comprises a spectral modifier.

7. The apparatus of claim 5, wherein the optical modifier comprises a polarization modifier.

8. The apparatus of claim 1, wherein the mirror comprises another dichroic filter that reflects only a portion of the second beam.

9. A method comprising:
   splitting an incoming electromagnetic beam into first and second beams having first and second spectral bands, respectively;
   reflecting the first and second beams along substantially parallel, non-overlapping paths to an objective lens;
   receiving the first and second beams on a focal plane array, the first and second beams travelling along non-overlapping paths from the lens to the focal plane array; and
   modifying the polarization of at least one of the first and second split beams.

10. The method of claim 9, further comprising modifying the spectrum of at least one of the first and second split beams.

11. The method of claim 9, wherein splitting an incoming electromagnetic beam into first and second beams having first and second spectral bands, respectively, further comprises passing the incoming electromagnetic beam through a dichroic filter that passes a portion of the incoming beam to a mirror creating the first beam, and reflects a portion of the incoming beam creating the second beam, the dichroic filter and mirror being arranged so as to reflect the first and second beams along the substantially parallel, non-overlapping paths.

* * * * *